(12) United States Patent
Seshadri et al.

(10) Patent No.: US 11,113,455 B2
(45) Date of Patent: Sep. 7, 2021

(54) WEB PAGE RENDERING ON WIRELESS DEVICES

(71) Applicant: Microsoft Technology Licensing, LLC, Redmond, WA (US)

(72) Inventors: Aravind Seshadri, Redmond, WA (US); Anand Muthurajan, Sammamish, WA (US); Jyh-Han Lin, Mercer Island, WA (US); Ke-Cheng Huang, Sammamish, WA (US); Patrick Plaisted, Redmond, WA (US); Rui Liang, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 809 days.

(21) Appl. No.: 14/106,818

(22) Filed: Dec. 15, 2013

(65) Prior Publication Data
US 2015/0169509 A1 Jun. 18, 2015

(51) Int. Cl.
*G06Q 30/00* (2012.01)
*G06F 40/143* (2020.01)
(Continued)

(52) U.S. Cl.
CPC .......... *G06F 40/143* (2020.01); *G06F 16/957* (2019.01); *G06Q 30/0267* (2013.01)

(58) Field of Classification Search
CPC ............... G06F 17/272; G06F 17/2247; G06F 17/30864; G06Q 30/02; H04L 5/0042;
(Continued)

(56) References Cited

U.S. PATENT DOCUMENTS 6,275,829 B1 8/2001 Angiulo et al.
6,397,217 B1 5/2002 Melbin
(Continued)

FOREIGN PATENT DOCUMENTS

| CN | 1327202 A | 12/2001 | |
|---|---|---|---|
| CN | 1867059 A | 11/2006 | |
| GB | 2346238 A | * 8/2000 | ........... G06F 40/106 |

OTHER PUBLICATIONS https://productforums.google.com/forum/#!topic/gmail/WTeceu9Wco0, Jan. 9, 2011 (Year: 2011).*
(Continued)

*Primary Examiner* — Michael Bekerman
(74) *Attorney, Agent, or Firm* — Wade IP Law PLLC

(57) ABSTRACT

A method and apparatus is described for rendering web pages by a wireless device in order to reduce an amount of data transmitted over-the-air to the wireless device. In one embodiment, a method is performed by a server, comprising receiving a markup language document from a web server via a network interface, the markup language document corresponding to a web page. Next, the markup language document is parsed into a number of blocks by a processor, each of the blocks comprising code representing original content of the web page. Then, the processor creates one or more replacement blocks, each of the replacement blocks corresponding to a respective one of the blocks, each of the replacement blocks comprising code representing substituted content of the web page. Some of the blocks and at least one of the replacement blocks are then sent to a wireless device for rendering.

20 Claims, 11 Drawing Sheets

(51) Int. Cl.
*G06F 16/957* (2019.01)
*G06Q 30/02* (2012.01)

(58) Field of Classification Search
CPC ... H04L 5/0046; H04L 5/0053; H04L 1/0006; H04L 5/143; H04L 1/0071; H04L 5/006; H04L 5/0007
USPC ............ 715/760; 707/E17.108, 999.003
See application file for complete search history.

(56) References Cited

U.S. PATENT DOCUMENTS

| | | | | |
|---|---|---|---|---|
| 8,645,411 | B1* | 2/2014 | Bandaru | G06F 40/114 707/769 |
| 9,043,441 | B1* | 5/2015 | Cheng | G06F 3/0481 709/219 |
| 2002/0059344 | A1* | 5/2002 | Britton | G06F 40/143 715/239 |
| 2003/0069881 | A1* | 4/2003 | Huttunen | G06F 16/986 |
| 2004/0012627 | A1* | 1/2004 | Zakharia | G06F 16/9577 715/744 |
| 2004/0131043 | A1* | 7/2004 | Keller | G09G 5/00 370/351 |
| 2005/0229111 | A1 | 10/2005 | Makela | |
| 2006/0123042 | A1 | 6/2006 | Xie et al. | |
| 2006/0256846 | A1* | 11/2006 | Oksman | H04L 1/0006 375/222 |
| 2007/0067267 | A1* | 3/2007 | Ives | G06Q 30/02 |
| 2007/0101061 | A1* | 5/2007 | Baskaran | G06F 17/30902 711/118 |
| 2008/0071857 | A1 | 3/2008 | Lie | |
| 2008/0072139 | A1* | 3/2008 | Salinas | G06F 16/9577 715/238 |
| 2009/0210498 | A1* | 8/2009 | Sze | H04L 67/04 709/206 |
| 2009/0210805 | A1* | 8/2009 | Sze | G06F 17/2247 715/760 |
| 2009/0282327 | A1 | 11/2009 | Hamilton et al. | |
| 2010/0146585 | A1* | 6/2010 | Li | H04L 67/32 726/1 |
| 2010/0302277 | A1* | 12/2010 | Jiang | G06F 16/9577 345/650 |
| 2012/0192080 | A1* | 7/2012 | Lloyd | G06F 16/9577 715/744 |
| 2013/0152009 | A1* | 6/2013 | Caliendo, Jr. | G06F 16/9577 715/781 |
| 2014/0024339 | A1* | 1/2014 | Dabbiere | H04M 15/885 455/406 |
| 2014/0053065 | A1* | 2/2014 | Yun | G06F 16/9577 715/238 |
| 2014/0095583 | A1* | 4/2014 | Houle | G06F 16/9577 709/203 |
| 2017/0228789 | A1* | 8/2017 | Macgillivray | G06Q 30/0267 |

OTHER PUBLICATIONS

Yu, Linchen, and Xiaofei Liao. "CloudWeb: A Cloud Based Webpage Transforming for Mobile Devices." 2013 IEEE 9th International Conference on Mobile Ad-hoc and Sensor Networks. IEEE, 2013. (Year: 2013).*

Cserkúti, Péter, et al. "SmartWeb—Web content adaptation for mobile devices." Fourth Slovakian-Hungarian Joint Symposium on Applied Machine Intelligence, Herlany. 2006. (Year: 2006).*

Yang, Stephen JH, et al. "Applying Semantic Segment Detection to Enhance Web Page Presentation on the Mobile Internet." J. Inf. Sci. Eng. 27.2 (2011): 697-713. (Year: 2011).*

Bickmore, et al., "Digestor: Device-Independent Access to the World Wide Web", In Journal: Computer Networks and ISDN Systems, vol. 29, Issue 8, Sep. 30, 1997, 8 Pages.

International Search Report & Written Opinion Issued in PCT Patent Application No. PCT/US2014/069175, dated Mar. 9, 2015, 10 Pages.

"International Preliminary Report on Patentability Issued in PCT Application No. PCT/US2014/069175", dated Apr. 7, 2016, 10 Pages.

"Second Written Opinion Issued in PCT Application No. PCT/US2014/069175", dated Jan. 7, 2016, 8 Pages.

Xinyi Yin and Wee Sun Lee, "Using Link Analysis to Improve Layout on Mobile Devices", Journal, May 17, 2004, 7 pages, 13th international conference on World Wide Web, WWW, www.id.uzh.ch/home/mazzo/reports/www2004conf/papers/1p338.pdf, published online.

Armando Fox and Eric A. Brewer, "Reducing WWW Latency and Bandwidth Requirements by Real-Time Distillation", May 6, 1996, 12 pages, Journal, Computer Networks and ISDN Systems, vol. 28, Issues 7-11, published online at pdf.aminer.org/000/794/034/reducing_www_latency_and_bandwidth_requirements_by_real_time_distillation.pdf.

"Data Compression in Chrome Beta for Android" [online], Chromium Blog [Retrieved on Mar. 20, 2018], Retrieved rom the Internet: <URL: https://blog.chromium.org/2013/03/data-compression-in-chrome-beta-for.html>, Mar. 5, 2013, 3 pages.

"A new way to save data with Chrome on Android" [online], Chrome Blog [Retrieved on Mar. 20, 2018], Retrieved rom the Internet: <URL: https://chrome.googleblog.com/2015/11/a-new-way-to-save-data-with-chrome-on.html>, Nov. 30, 2015, 5 pages.

"First Office Action and Search Report Issued in Chinese Patent Application No. 201480068257.9", dated Oct. 22, 2018, 14 Pages.

"Office Action Issued in Chinese Patent Application No. 201480068257.9", dated Aug. 2, 2019, 12 Pages.

"Office Action Issued in Chinese Patent Application No. 201480068257.9", dated Mar. 26, 2020, 7 Pages.

"Office Action Issued in Indian Patent Application No. 201647018379", dated Aug. 4, 2020, 8 Pages.

* cited by examiner

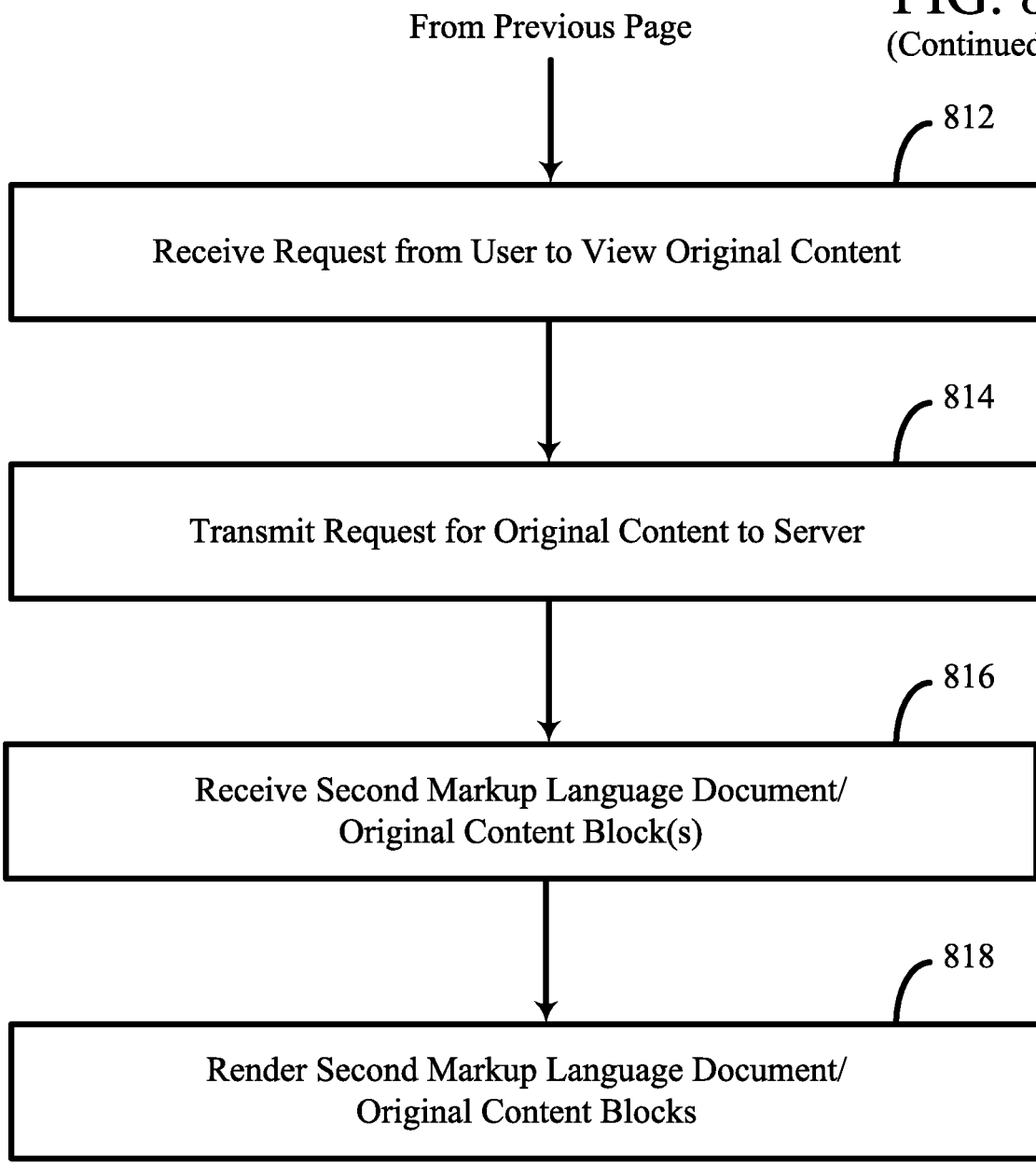

WEB PAGE RENDERING ON WIRELESS DEVICES

BACKGROUND

The use of wireless devices, such as smartphones and tablets, has caused a revolution in the way people receive information. For example, surfing the World Wide Web via smartphone has become commonplace. In the past, the limited screen size, processing power, and bandwidth of wireless devices caused many web sites to offer simplified versions of their web pages, modifying the layout and minimizing the amount of data needed for over-the-air transmission. However, with recent technological advancements in wireless device technology, there is a trend today towards delivering original, complex web page content to wireless devices.

While many wireless devices are now technologically capable of presenting original, complex web pages to users, there are a number of problems in doing so. For example, transmitting large amounts of data over-the-air may result in large data usage fees for consumers. Battery life of wireless devices may be reduced as a result of having to process complex web pages. Wireless data providers may experience a reduction in bandwidth. Finally, a significant portion of older wireless devices still in use are not capable of presenting these original, complex web pages in their web browsers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The embodiments described herein relate to web page rendering by wireless devices in order to reduce an amount of data transmitted over-the-air to the wireless devices. In one embodiment, a method is performed by a server, comprising receiving a markup language document from a web server via a network interface, the markup language document corresponding to a web page. Next, the markup language document is parsed into a number of blocks by a processor, each of the blocks comprising code representing original content of the web page. Then, the processor creates one or more replacement blocks, each of the one or more replacement blocks corresponding to a respective one of the blocks, each of the replacement blocks comprising code representing substituted content of the web page. Some of the blocks and at least one of the replacement blocks are then sent to a wireless device via the network interface for rendering by the wireless device.

In another embodiment, a wireless device for rendering web pages is described, comprising a memory for storing processor-executable instructions, a wireless transceiver, and a processor coupled to the memory and the wireless transceiver. The processor-executable instructions are executed by the processor, which causes the wireless device to transmit an HTTP request to a server and, in response, receive one or more blocks from the server, each of the blocks comprising markup language corresponding to original content of the requested web page. One or more replacement blocks are also received, each of the replacement blocks comprising markup language corresponding to substituted content of the requested web page. A modified web page is rendered on the wireless device based on the one or more blocks and the one or more replacement blocks on a user interface of the wireless device.

In yet another embodiment, a system is described for rendering web pages on a mobile device, comprising a server that comprises a network interface for sending a modified version of a first web page to the wireless device, the modified version of the first web page comprising blocks and replacement blocks. The server further comprises a first processor coupled to the network interface and configured to parse a markup language document representative of the first web page into a number of the blocks, each of the blocks comprising code representing original content of the first web page, and to create one or more replacement blocks, each of the one or more replacement blocks corresponding to a respective one of the blocks, each of the replacement blocks comprising code representing substituted content of the first web page. The system further comprises the wireless device, comprising a wireless transceiver for transmitting HTTP requests to the server and for receiving the blocks and replacement blocks. The wireless device further comprises a second processor, coupled to the wireless transceiver, for generating the HTTP requests and for rendering the blocks and replacement blocks to form the modified web page, and a user interface for displaying the modified web page.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The descriptions of embodiments disclosed herein relate to techniques for web page rendering by wireless devices that reduce the amount of data normally transmitted overthe-air to such wireless devices. The current trend in wireless technology today is to provide full, complex web pages to wireless devices, resulting in large amounts of data being transmitted over-the-air. The increase of data transmitted over-the-air typically results in increased wireless data costs for consumers, decreased battery life of wireless devices, decreased bandwidth available to service providers, and difficulties in processing the standard web pages on older wireless devices. The embodiments discussed herein, thus, minimize the amount of data transmitted over-the-air to wireless devices.

Figure 1:
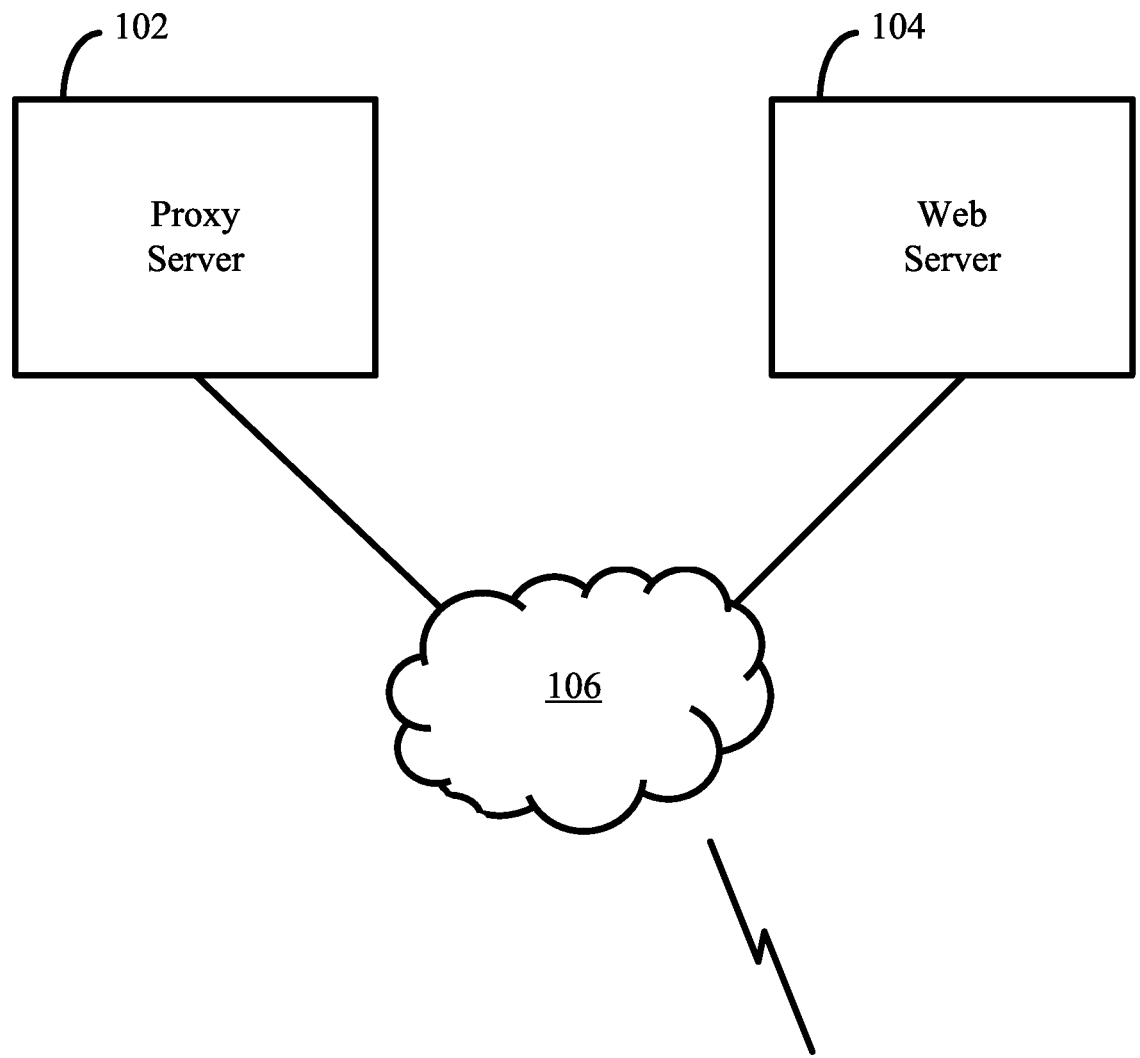
FIG. 1 illustrates one embodiment of a wireless communication system for use in rendering web pages by a wireless device in a manner that minimizes an amount of data transmitted over-the-air.
Figure 1:
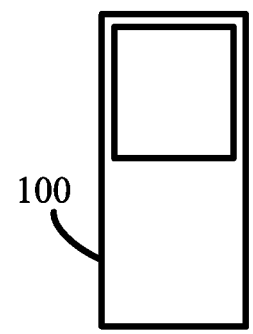

FIG. 1 illustrates one embodiment of a communication system for use in rendering web pages by wireless devices in a manner that minimizes an amount of data transmitted over-the-air. Shown is wireless device (WD) 100, proxy server 102, web server 104, and wide-area network 106, such as the Internet. WD 100 may comprise a smartphone, a tablet computer, a laptop computer, a fixed, wireless data terminal, or virtually any other electronic device capable of wirelessly receiving and displaying information provided by a server, such as proxy server 102 or web server 104.

Proxy server 102 comprises one or more electronic computing devices or other processing units configured to act as an intermediary for requests from wireless devices, such as WD 100, seeking resources from other servers, such as web server 104. For example, WD 100 may request a service provided by proxy server 102, such as providing an HTML document to WD 100 for rendering and display to a user of WD 100. Proxy server 102 comprises any device that executes instructions (e.g., as application programs, operating systems, and/or other processor-executable code) to implement the operations and functionality associated with proxy server 102.

Web server 104 comprises one or more electronic computing devices or other processing units configured to offer information to clients via wide area network 106 in the form of web pages, downloadable files, text, images, and/or videos. Web server 104 is typically used to host web sites, although it could also be used for other purposes, such as gaming or running enterprise applications. The web server 104 may receive HTTP requests from the proxy server 102, i.e., requests to provide web pages, typically in the form of a markup language document such as an HTML document, XML document, etc. Web server 104 comprises any electronic computing device executing instructions (e.g., as application programs, operating systems, and/or other, processor-executable code) to implement the operations and functionality associated with web server 104.

Wide area network 106 comprises one or more information transmission networks, such as the Internet, cellular communication networks, satellite communication networks, cellular data networks, traditional telephone networks, radio networks, local area networks, or fiber optic networks, used to transport information from a source entity to a destination entity. For example, WD 100, proxy server 102, and web server 104 may all be considered source and destination entities. Typically, information is transmitted over at least some of wide area network 106 in the form of data packets using well-known communication protocols such as TCP/IP, FTP, SMTP, etc.

Figure 2:
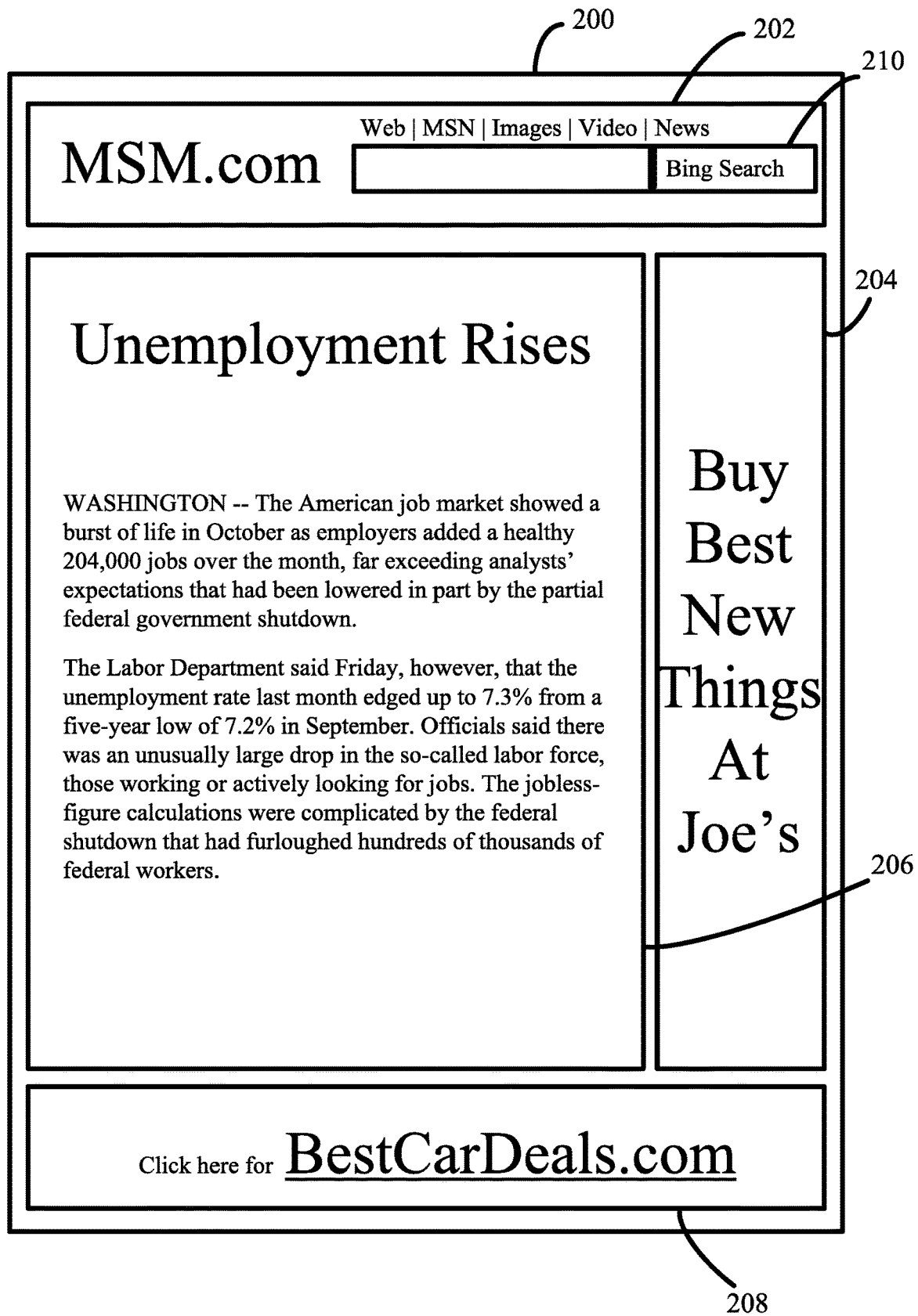
FIG. 2 illustrates a typical web page displayed by a desktop computer, highlighting different sections of the web page.

A user of WD 100 may send an HTTP request to view a web page offered by web server 104 using a web browser running on WD 100. The HTTP request, typically in the form of a target IP address and resource request, is transmitted from WD 100 to proxy server 102 via wide area network 106. Proxy server 102 receives the request and, in turn, sends an HTTP request message to web server 104 for web server 104 to provide a markup language document representing an original version of the requested web page to proxy server 102. The term "original" meaning that the markup language document is a "standard" or "full" version of a web page offered by web server 104 to client devices that are not bandwidth constrained, such as desktop or laptop computers connected to wide area network 106 via a high-speed data connection such as DSL, cable, or some other high-bandwidth connection technique. In other words, the markup language document from web server 104 represents a complex form of the requested web page, complete with HTML code, Javascrips, and Cascading Style Sheet (CSS). An example of an original web page showing original content is shown in FIG. 2 as original web page 200, shown as it would be displayed on a desktop computer screen. FIG. 2 illustrates how a web page may comprise a number of sections. In this example, web page 200 comprises header section 202, side section 204, main section 206, and footer section 208. It should be understood that web page 200 is merely one example of a web page, and that other web pages might have a greater or fewer number of sections, and/or that multiple section types might be present, such as a web page having two or more side sections (e.g., right side section and left side section), main sections, headers, footers, etc. It should be further understood that in most cases, the lines defining the boundaries of each section are not present in typical web pages.

Each of the sections shown in FIG. 2 comprises original web page content, e.g., text, images, videos, hyperlinks, and other viewable information in a web page designed for a rendering on a non-limited display, such as on a desktop computer display. Original web page content may be differentiated between mobile web page content, which may comprise a simplified version of a web page, having a different format, look, or feel than a web page designed for non-mobile applications.

Header section 202 typically comprises text and/or images denoting an identification of the web site, in this case, www.msn.com, and other information. In this case, a search bar 210 is also present, allowing access to a convenient web search, along with tools such as Web, MSN, Images, Video, or News used for presenting the search results. Footer section 208 may comprise text, images, hyperlinks, videos, or other information distinct from other sections of web page 200. In this case, footer section 208 comprises an advertisement in the form of a hyperlink for a web site called "bestcardeals.com". Side section 204 comprises another area of web page 200 distinct from other sections, and may comprise text, images, videos, hyperlinks or other information. In the embodiment shown in FIG. 2, side section 204 comprises a text advertisement for "Joe's". Main section 206 comprises text, images, videos, hyperlinks or other information generally related to the nature of the website. For example, main section 206 might comprise a recipe if the web page relates to food or recipes. In another example, main section 206 might comprise financial information if web page 200 is related to finance. In the present example shown in FIG. 2, main section 206 comprises a text article about unemployment, where web page 200 is a general web "portal" having a variety of information and news articles.

The proxy server 102 receives the markup language document from web server 104 and, in response, parses the markup language document into two or more blocks of code representing original content of the web page. Such parsing may be performed by a proxy server 102 or web server 104, in one embodiment, by executing a computer program that identifies blocks of code between certain markers contained in the markup language document. For example, a web page provided to proxy server 102 in the form of an HTML document may be parsed into multiple blocks, each block representing a section of original content of the web page. Each block may be defined as the HTML code contained between <div> tags contained in the HTML document. Other embodiments of parsing are described later herein.

In one embodiment, the proxy server 102 ranks, rates, or otherwise prioritizes the blocks parsed from the web page by assigning a value to each block based on one or more characteristics of the blocks or the content that the blocks represent. The value may be based, for example, on a user desirability metric, i.e., whether the information represented by the block is determined to be highly desired by, or relevant to, the user, or to a majority of users, in which case a high value might be assigned, or whether the information represented by the block is of a secondary importance to most users, or to a particular user, and thus a low value might be assigned. The value may additionally, or alternatively, be based on a type of information contained in the block (i.e., advertisement, non-advertisement, video information, text information, image information), an amount of each of the types of information in any block (for example, a block having 5 or more videos might be assigned a low value), a size of the block (e.g., a large amount of data may be assigned a low value while a small amount of data may be assigned a high value, based on a predetermined threshold, such as 1 megabyte). The content represented by the block may be evaluated using text-recognition techniques to determine if the content may be less desirable to users, such as an advertisement, or whether the content is more desirable to users, such as a news article, recipe, or other information-bearing content.

The possible number of values that may be assigned to blocks may vary in one embodiment verses another. For example, in one embodiment, blocks may be assigned one value out of two possible values while, in another embodiment, blocks are assigned one value out of five possible values, the values determined by comparing block/block content characteristics to one or more thresholds.

In one embodiment, blocks that are assigned a value less than a predetermined threshold are stored within the proxy server 102, or at some other location, in conjunction with their respective values. In another embodiment, all blocks are stored in conjunction with their respective, assigned values. In yet another embodiment, none of the blocks are stored and some or all of the blocks are used to either create a modified markup language document representing a modified web page, or the blocks are sent to WD 100 as a response to the HTTP request, as will be discussed below.

In one embodiment, after values have been assigned to the blocks, the proxy server 102 may build a modified markup language document by using only blocks having a value greater than a predetermined threshold and replacing blocks that do not meet the threshold with replacement blocks, each of the replacement blocks comprising code representing substituted content of the web page. For example, a block representing a large file such as a video, assigned a low value, might be replaced by a replacement block comprising code that, when rendered by WD 100, produces a simple visual graphic such as a blank space in a web browser or a blank space plus simple text or hypertext, and/or an icon, indicating that some of the original content of the web page has been replaced by the simple visual graphic. For example, a replacement block might comprise code or script that, when rendered by WD 100, produces a text message/ hyperlink on blank space or other simple background such as, "Press here to receive the original content". The text or hypertext may provide an indication as to the nature of the original content, such as "Advertisement", "Auto Advertisement", "More News", "Contact Information", "Header", "Footer", "Video", a vender name or website, etc. The modified markup language document is then provided to WD 100 via wide area network 106.

Often, replacement blocks comprise less data than respective blocks that they replace, advantageously reducing the amount of data that is transmitted over-the-air to the WD 100 that requested the web page.

In another embodiment, rather than building a modified markup language document using blocks and replacement blocks, proxy server 102 sends the blocks and one or more replacement blocks to WD 100 for web page construction and rendering by WD 100 to create a modified version of the web page with at least some original content replaced by substitute content.

In one embodiment, WD 100 receives the modified markup language document constructed by proxy server 102 and renders a modified web page for display to the user via a web browser running on WD 100. In another embodiment, WD 100 receives one or more high value blocks and one or more replacement blocks and renders these blocks to construct a modified web page. The modified web page is presented with one or more visual portions of the original web page replaced with substituted content, the substituted content comprising a simple visual graphic such as whitespace, text, hyper-text, or an icon, generated from one or more of the replacement blocks. In one embodiment, the modified web page presented to the user retains the formatting of the original web page. For example, each section retains its relative placement within the viewable area of the display. Such a rendering is shown in FIG. 3.

Figure 3:
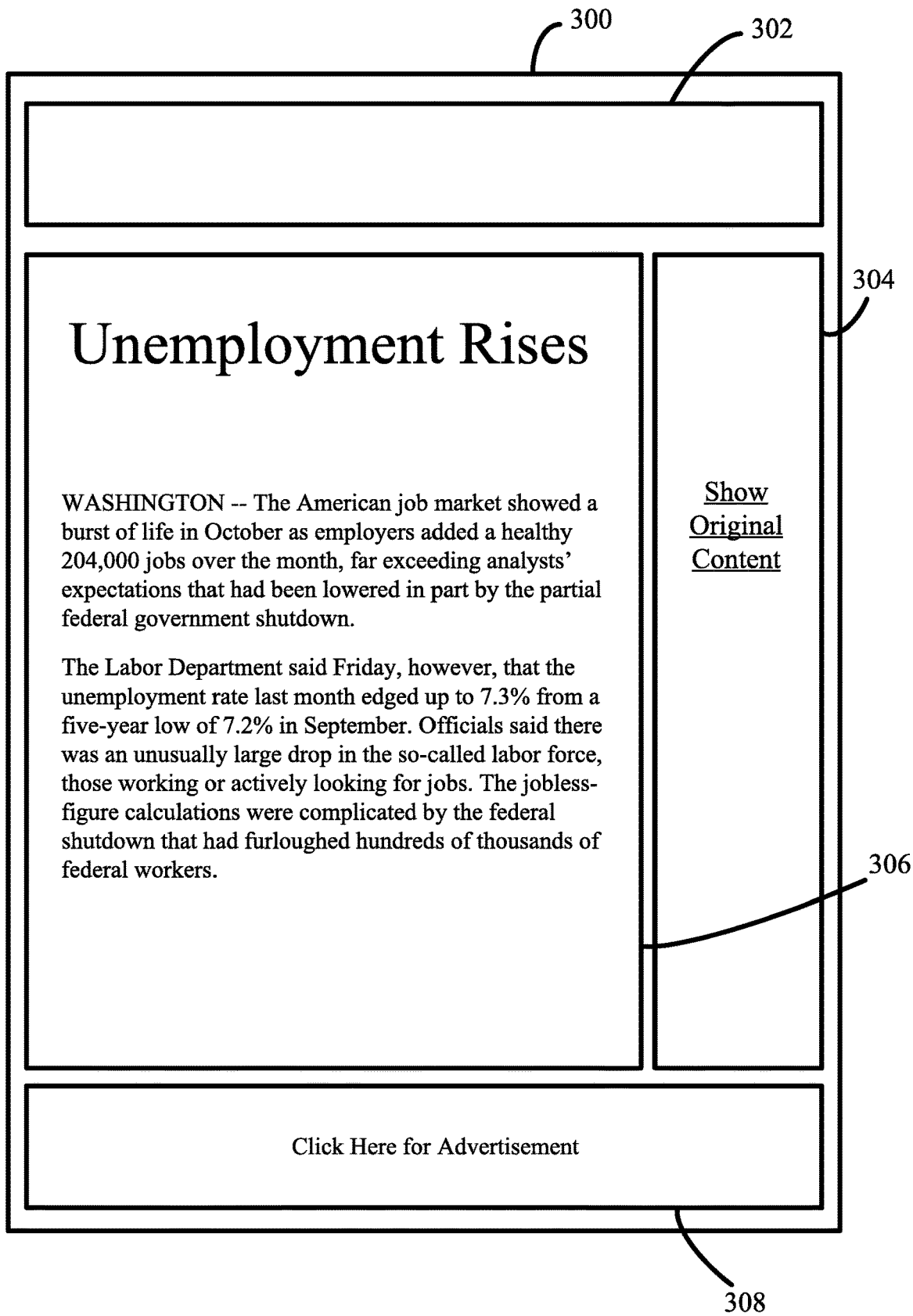
FIG. 3 illustrates a modified web page of the web page shown in FIG. 2 that is displayed by the wireless device shown in FIG. 1, the modified web page comprising some substituted content.

FIG. 3 shows a modified web page 300 as it is rendered on WD 100. The modified web page 300 comprises one visual section of original content 306, corresponding to original content section 206 in FIG. 2 contained in the original web page, and three sections of substituted content 302, 304, and 308. Again, it should be understood that in most cases, the lines defining the boundaries of each section are not displayed on typical web pages.

Sections 302, 304, and 308 illustrate sections of substituted content, each corresponding to a particular replacement block, shown in FIG. 3 as either a blank space (section 302) or blank spaces with text and/or a hyperlink (sections 304 and 308) instructing a user to "Show Original Content," or "Click Here" to retrieve original content such as an advertisement, a video, a full-sized image, etc. In one embodiment, the text/hypertext in sections of substituted content may provide an indication as to the type of original content that has been replaced. For example, in FIG. 3, section 308 indicates that the original content comprises an advertisement, as opposed to a news article, or some other form of content. In another embodiment, further details may be provided regarding the type of original content, for example, the text/hypertext in section 308 might recite, "Click here for Auto Advertisement," "Click here for Buick Car Advertisement," "Click here for Amazon.com Deals", etc.

Figure 4:
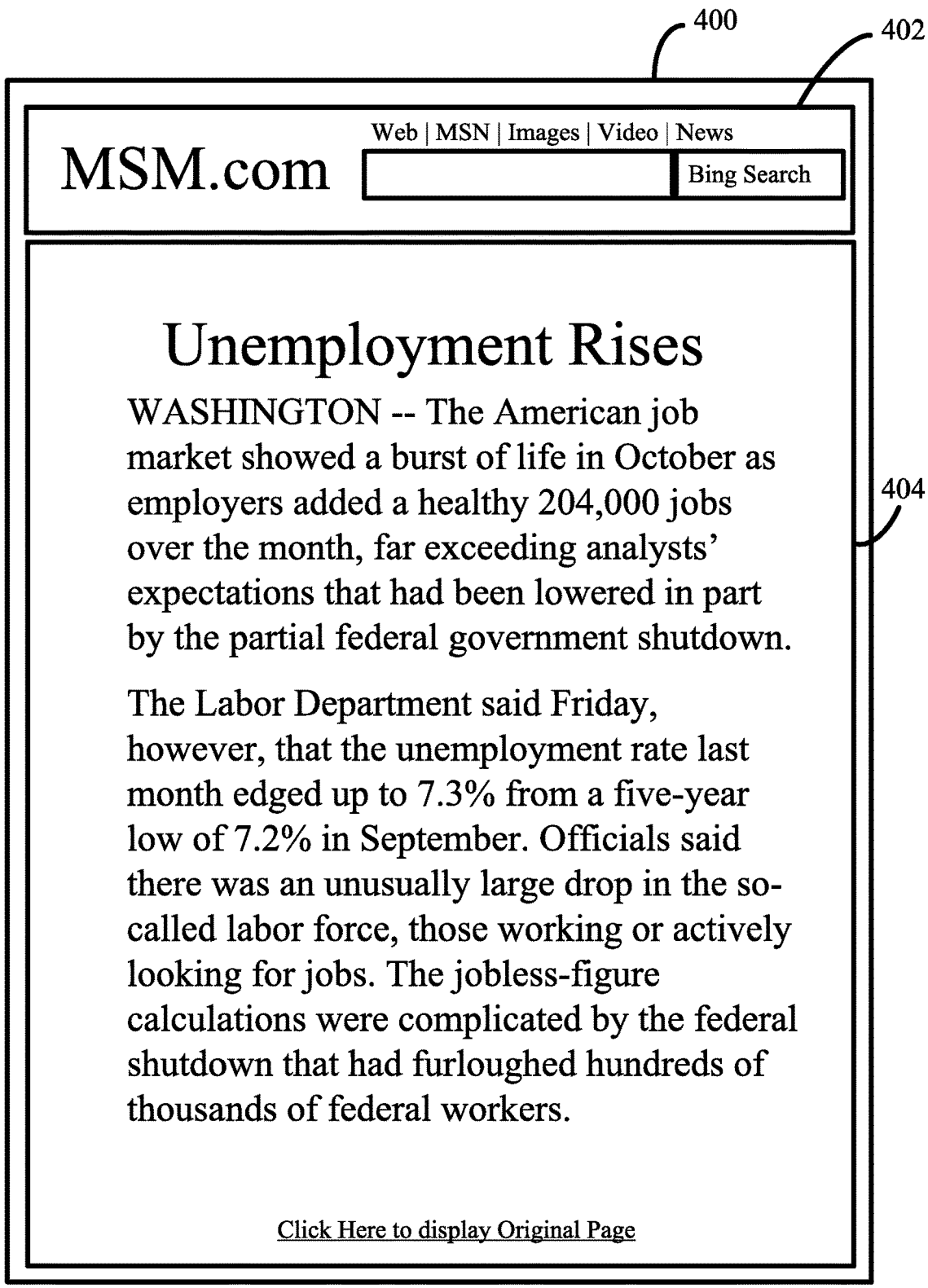
FIG. 4 illustrates another modified web page of the web page shown in FIG. 2 that is displayed by the wireless device shown in FIG. 1, where the web page format has been modified.

In another embodiment, the modified web page is reformatted to deliver a uniform presentation of the content represented by high value blocks to the user, as shown in FIG. 4. In the example of FIG. 4, a modified web page 400 comprises a header section 402 and a main section 404, each of the header section 402 and main section 404 comprising original content from the original web page 200. For example, the header section 402 might comprise a title of a web site associated with the original web page, while main section 404 might comprise one or more textual news articles from the original web page. However, formatting of the main section 402 may be modified such that it fills most of the modified web page 400. As shown in FIG. 4, the font of the news article has been increased to fill most of the viewable area of a visual display device of WD 100.

If a user desires to view original content that is not visible to the user in the modified web page as a result of using one or more replaced blocks, the user may provide an indication to WD 100, typically by touching an area of a touchscreen display corresponding to the substituted content, for example, an area on the modified web page displaying a simple background and/or a hyperlink that has been rendered from one or more replacement blocks.

In response, WD 100 sends a request to proxy server 102 to provide the original content associated with the substituted content identified by the user. In another embodiment, selection of any section of replaced content by a user results in a request to proxy server 102 to provide all of the original content associated with either the entire web page, or just the presently-viewable area of the modified web page. In one embodiment, in response to the user's request, proxy server 102 provides an original version of the markup language document previously received by proxy server 102 from web server 104. In another embodiment, proxy server 102 retrieves one or more low value blocks stored in memory corresponding to the substituted content requested by the user, builds a second, modified markup language document using high value blocks and the low value blocks corresponding to the original content requested by the user, and sends this second, modified markup language document to WD 100. In yet another embodiment, proxy server 102 retrieves and sends low value blocks corresponding to the original content requested by the user to WD 100 for rendering by WD 100. Details of these embodiments are explained below.

Figure 5:
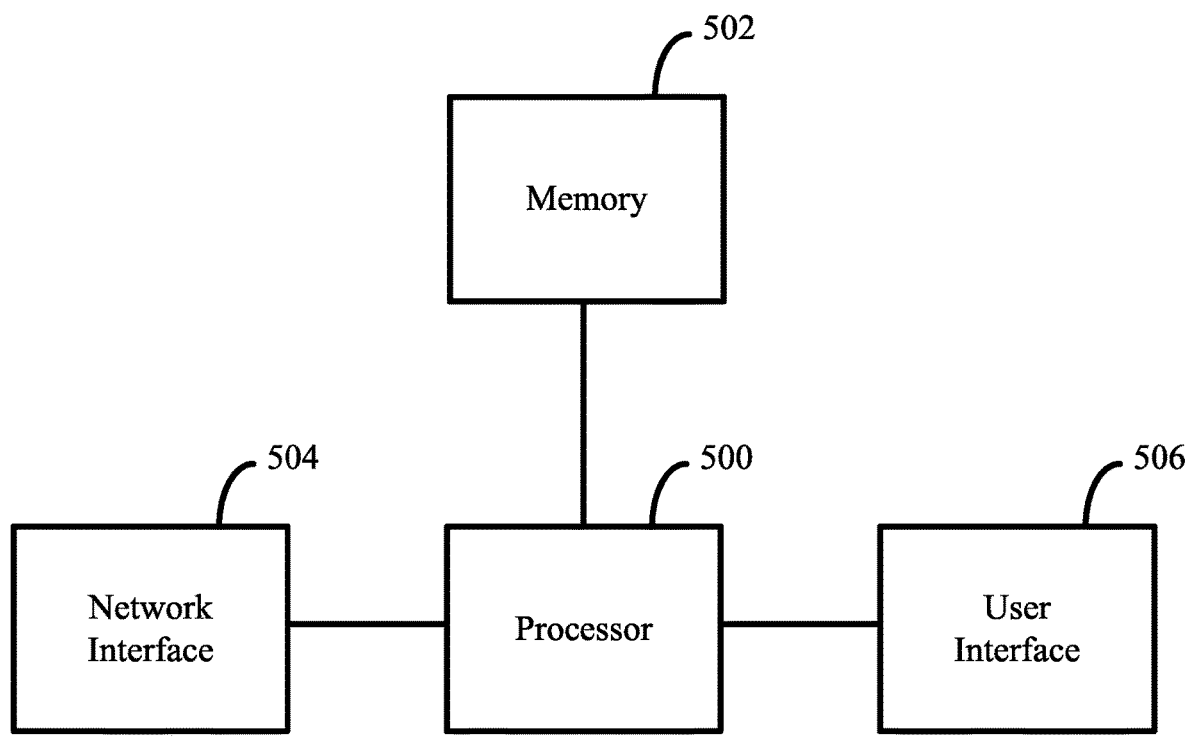
FIG. 5 illustrates a functional block diagram of one embodiment of the proxy server shown in FIG. 1.

FIG. 5 illustrates a functional block diagram of one embodiment of proxy server 102. Proxy server 102 typically comprises a processor 500, a memory 502, a network interface 504, and an optional user interface 506. Proxy server 102 may comprise a computer, server, or other processing device that executes processor-readable instructions stored in memory 502 that enables proxy server 102 to perform the functionality described herein. It should be understood that the functional blocks shown in FIG. 5 may be connected to one another in a variety of ways, and that some basic functionalities have been omitted (such a power supply function) for purposes of simplicity and clarity.

Processor 500 comprises a microprocessor, microcontroller, and/or other circuitry that is able to execute processor-executable instructions, and suitable for use in a server application setting. Alternatively, processor 500 may comprise a custom or semi-custom ASIC able to carry out the functionality required to reduce data transmitted over-the-air for rendering by WD 100. Processor 500 performs the functionalities described herein by executing processor-executable instructions stored in memory 502.

Memory 502 comprises one or more information storage devices accessible by processor 500 and may include one or both of volatile and nonvolatile media, and/or removable and/or non-removable media, but excludes propagated signals. By way of example, and not limitation, such as volatile and/or nonvolatile, removable and/or non-removable media may be implemented in any method or technology for storage of information such as processor-executable instructions, data structures, program modules, blocks of code representing sections of original content of web pages, replacement blocks of code representing substituted web page content, and/or other data. Memory 502 includes, but is not limited to, RAM, ROM, EEPROM, flash memory, optical storage, magnetic cassettes, magnetic tape, magnetic disk storage or other magnetic storage devices, or any other media suitable for use in a server application setting.

Network interface 504 comprises circuitry configured to transmit and receive information over wide area network 106. Typically, network interface 504 comprises a wired or wireless Ethernet port, a T1 port, a T3 port, or other port typically used in the networking industry.

User interface 506 comprises circuitry for allowing a user of proxy server 102, such as an authorized technician or service provider, to perform various duties related to the provisioning, maintenance, and/or upkeep of proxy server 102. User interface 506 may comprise one or more commonly used input and/or output devices, such as a keyboard, mouse, touchscreen, video display, and/or virtually any other device that allows a user to interact with proxy server 102.

Figure 6:
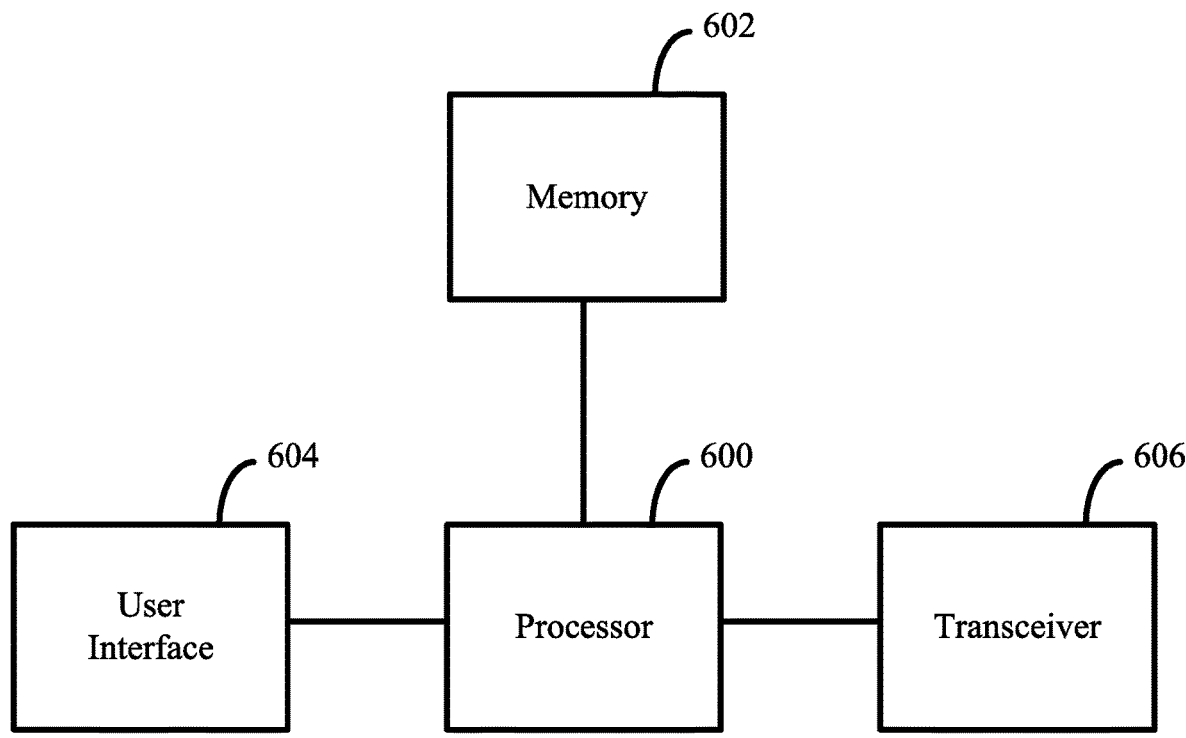
FIG. 6 illustrates a functional block diagram of one embodiment of the wireless device shown in FIG. 1.

FIG. 6 illustrates a functional block diagram of one embodiment of WD 100. Specifically, FIG. 6 shows processor 600, memory 602, user interface 604, and transceiver 606. It should be understood that the functional blocks shown in FIG. 6 may be connected to one another in a variety of ways, and that certain, basic functionalities have been omitted (such as power supply functionality) for purposes of simplicity and clarity.

Processor 600 comprises one or more processors, such as microprocessors, microcontrollers, custom or semi-custom ASICs that are configured to provide general operation of WD 100 by executing processor-executable instructions stored in memory 602. Processor 600 is typically a processor designed for mobile telephony applications, such as a processor designed for low power consumption, small size, high processing power, and/or other features desirable in mobile processing applications. A wide variety of such processors are available in the marketplace today.

Memory 602 comprises one or more information storage devices that can be accessed by processor 600 and may include one or both of volatile and nonvolatile media, and/or removable and/or non-removable media, but excludes propagated signals. By way of example, and not limitation, such media may be implemented in any method or technology for storage of information, such as processor-executable instructions, data structures, program modules, or other data. Memory 602 includes, but is not limited to, RAM, ROM, EEPROM, flash memory, or other type of memory technology used in modern smartphone designs, optical disk storage, magnetic cassettes, magnetic tape, magnetic disk storage or other magnetic storage devices, or any other medium which can be used to store information necessary for operation of WD 100 and which can accessed by processor 600. In typical applications, memory 602 comprises more than one memory type, for example, it is common to find both RAM memory as well as flash memory in modern smartphones.

Transceiver 606 comprises circuitry and/or firmware necessary for wirelessly transmitting and receiving information using one or more wireless protocols, such as any variety of CDMA, GSM, 802.11 (Wi-Fi), Wi-Fi Direct, LTE, WIMAX, etc. Transceiver 606 may comprise a single or multiple integrated circuits, discreet components, or custom or semi-custom ASICS, and are readily available in the marketplace.

User interface 604 is coupled to processor 600 and allows a user of WD 100 to operate and interact with WD 100. For example, user interface 604 may comprise one or more pushbuttons, switches, sensors, touchscreens, keypads, keyboards, ports, and/or microphones that generate electronic signals for use by processor 600 upon initiation by a user. User interface 604 may additionally comprise one or more visual displays, such as a liquid crystal display (LCD), organic light-emitting diode (OLED), or any other type of device for visual display of information to users. User interface 604 may alternatively, or in addition, comprise one or more audio generation devices, such as a speaker, as well as a tactile alert mechanism, such as a vibration-generation device that may be used to provide non-auditory signals to users. Of course, the aforementioned items could be used alone or in combination with each other and other devices may be alternatively, or additionally, used. In some implementations user interface 604 may support natural user interface (NUI) methods. Examples of NUI methods include those relying on speech recognition, touch and stylus recognition, gesture recognition both on screen and adjacent to the screen, air gestures, head and eye tracking, voice and speech, vision, touch, gestures, and machine intelligence. Specific categories of NUI technologies include touch sensitive displays, voice and speech recognition, intention and goal understanding, motion gesture detection using depth cameras (such as stereoscopic camera systems, infrared camera systems, rgb camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Figure 7:
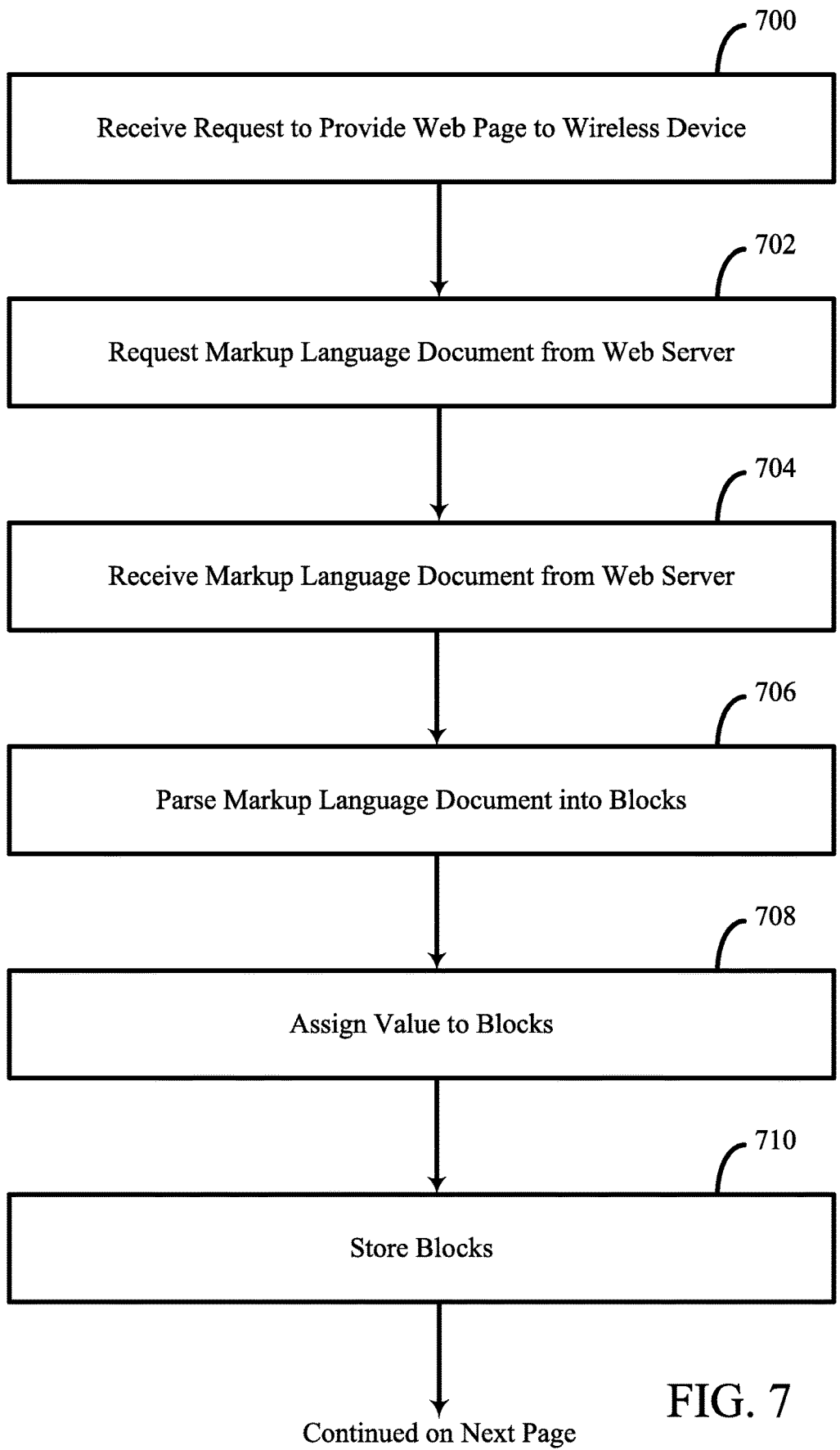
FIG. 7 is a flow diagram illustrating one embodiment of a method for rendering web pages, performed by the proxy server shown in FIG. 1.
Figure 7:
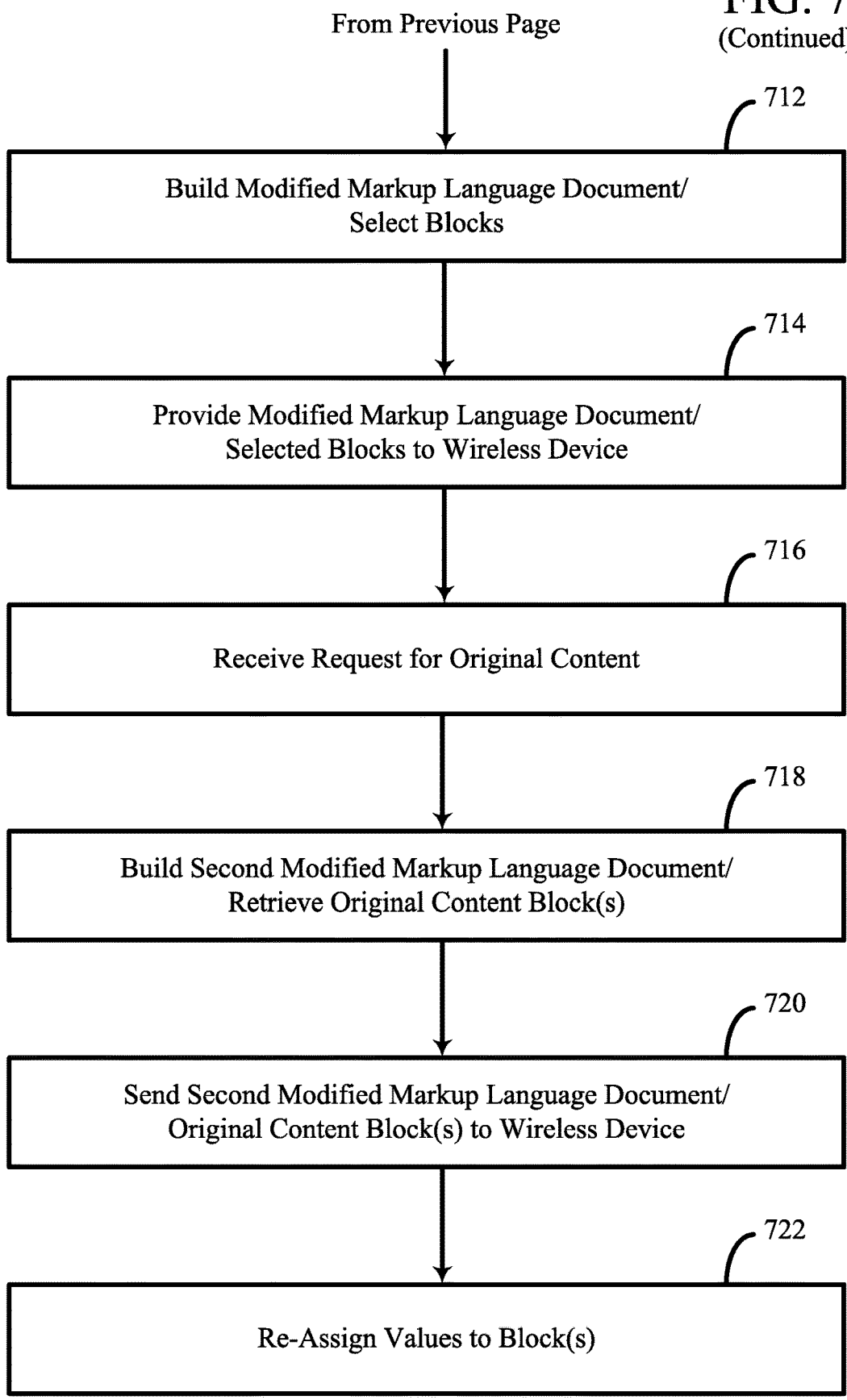

FIG. 7 is a flow diagram illustrating one embodiment of a method for rendering web pages, as performed by proxy server 102, in order to reduce the amount of data transmitted over-the-air to WD 100. The method is implemented by processor 500 executing processor-executable instructions stored in memory 502. It should be understood that in some embodiments, not all of the steps shown in FIG. 7 are performed and/or that the order in which the steps are carried out may vary. Finally, some minor method steps have been omitted for purposes of clarity and simplicity.

At block 700, proxy server 102 may receive an HTTP request from WD 100 to provide one or more web pages to WD 100 using a data reduction mode. The data reduction mode reduces the amount of data transmitted over the air to WD 100. The request may instruct proxy server 102 to enter into a particular data reduction mode, such as a mode that utilizes an image compression technique and/or a block replacement technique, or it may simply instruct proxy server 102 to enter into a data reduction mode determined by proxy server 102. For example, upon receiving a first request to enter into a data reduction mode, proxy server 102 may be programmed to begin providing web pages to WD 100 using image compression techniques and, upon receipt of a second request, begin providing web pages to WD 100 using the block replacement technique. In any case, proxy server 102 provides subsequent web page information to WD 100 using at least one data reduction technique.

At block 702, proxy server 102 requests a markup language document from a web server via network interface 504, the markup language document typically corresponding to a web page. Proxy server 102 may request the markup language document as a result of receiving an HTTP request from WD 100, or it may request the markup language document as part of an autonomous process to archive a large number of web pages.

At block 704, proxy server 102 receives the requested markup language document from web server 104 via network interface 504 and provides it to processor 500.

At block 706, proxy server 102 parses the received markup language document into two or more blocks, each block comprising code representing a portion of the original web page. In one embodiment, at least some of the blocks are created using a section of code from the markup language document received from web server 104. In one embodiment, at least some of the blocks are created by copying markup language between a "start" <div> tag and an "end" <div> tag found in the markup language document provided by web server 104. In general, any other HTML element could be used to parse the markup language document, including elements such as "Body", "Table", "Row", "Section", "Footer", "Header", etc. In another embodiment, text files may be parsed using the "textfieldparser" object in Visual Basic. In yet another embodiment, an HTML DOM object tree is compared against a library of known section-delimiting information. In yet still another embodiment, markup language documents are parsed based on a visual presentation of the content on a device. For example, a long web page may be viewable only by scrolling down or sideways on WD 100. In this case, the content normally shown at the top portion of the long web page is parsed as one block, and the content normally shown only after scrolling is parsed as a second block. Other embodiments include the use of open source tools such as Nreadability or HtmlAgilityPack. In any of these embodiments, Xpath strings are typically generated which are used to form blocks and/or replacement blocks.

At block 708, proxy server 102 may assign a value to at least some of the blocks based on a characteristic of the block itself, or the content of the block when rendered by WD 100. For example, the value assigned to any block could be based on a user desirability metric, i.e., whether the information represented by the block is determined to be highly desired by, or relevant to, the user, or to a majority of users, in which case a high value might be assigned, or whether the information represented by the block is of a secondary importance or relevance to most users, or to a particular user, and thus a low value might be assigned. The value may additionally, or alternatively, be based on a type of information contained in the block (i.e., advertisement, non-advertisement, video information, text information, image information), an amount of each of the types of information in any block (for example, a block having 5 or more videos might be assigned a low value), a size of the block (e.g., a large amount of data may be assigned a low value while a small amount of data may be assigned a high value, based on a predetermined threshold, such as 1 megabyte). For example, if a web page is related to food recipes, a recipe for apple pie may be determined to be particularly relevant and desirable for users to view, and blocks relating to the recipe or a digital image of a pie are assigned a "high" value. A "low" value may be assigned to content not as desirable or relevant to a user or group of users as "high" value content. The characteristics of a block may include the size of a block or an amount of data contained within a block. For example, blocks containing a large amount of data may indicate, for example, a video, and may be assigned a "low" value, while small blocks, possibly representing text, may be assigned a "high" value. One or more block size thresholds could be established by an administrator of proxy server 102 or by a user of WD 100 and used to assign values by block size as compared to the thresholds. For example, blocks having a size less than a first threshold could be assigned a first value, blocks exceeding the first threshold and less than a second threshold could be assigned a second value, while blocks exceeding the third threshold could be assigned a third value. Values may comprise two or more values, for example, two values (i.e., high relevancy or low relevancy), three values (i.e., "small", "medium", or "large" block sizes, etc.), ten values (i.e., a value between one and ten, ten being the highest value and one being the lowest value), etc.

At block 710, in one embodiment, at least some of the blocks are stored in memory 502 for use in subsequent HTTP requests or to provide original web page content to WD 100, as explained below.

In one embodiment, at block 712, processor 500 builds a modified markup language document by replacing at least one block assigned with a low value with a replacement block having substituted content. The substituted content typically contains less information than the block that it replaces which results in a reduction in the amount of data transmitted over-the-air to WD 100. In other words, the modified markup language document is constructed from one or more blocks designated as high value and one or more replacement blocks designated as lower value. When rendered by a web browser on WD 100, the modified markup language document will appear to be missing sections of visual content relating to the low value blocks that were replaced during construction of the modified markup language document by processor 500, as shown in FIG. 3. In one embodiment, a replacement block comprises markup language that, when rendered by a web browser, inserts a simple visual graphic, such as a blank space, into a section of the web page, replacing original content assigned a low value by processor 500. In another embodiment, the replacement block comprises markup language that, when rendered by a web browser, provides a blank space along with a text message indicating that some original content has been purposely replaced, and/or a hypertext message for the user to press in order to view the original content.

In another embodiment, rather than construct a modified markup language document at block 712, processor 500 selects one or more high value blocks and one or more replacement blocks created from the markup language document provided by web server 104 for transmission to WD 100 for rendering by WD 100. Selection of blocks by processor 500 may be based on keeping the total amount of data transmitted over-the-air less than a predetermined amount, either as a percentage of the size of the markup language document or a predetermined fixed or variable size. In one embodiment, the blocks are analyzed by processor 500 to determine if the content of any blocks are related to advertisement content, for example visual and/or textual content promoting the purchase of goods or services. If so, these blocks may be replaced with replacement blocks that are transmitted to WD 100 instead of the blocks determined to be advertisement related.

At block 714, the modified markup language document, or simply the high value blocks and selected replacement blocks, is/are sent to WD 100 via network interface 504 and wide area network 106.

At block 716, proxy server 102 receives a request from WD 100 to provide at least some of the original content that was replaced by the one or more replacement blocks sent at block 714. The request may identify a particular section of the modified web page to be updated with original content, may comprise a request to download the next-higher value block(s) of content, or may comprise a request to provide all of the low value blocks that were not sent to WD 100 at block 700 714. The request may comprise an identification of particular blocks to send to WD 100, an instruction to send any block assigned a certain value identified by WD 100, an indication to send low value blocks in order to render an entire first page of a web page, an indication to send all blocks related to the web page, or some other variation or combination of instructions.

In one embodiment, at block 718, processor 500 builds a second markup language document using the high value blocks stored in memory 502, as well as any low value blocks associated with original content requested by WD 100 at block 716. In another embodiment, processor 500 does not build a second markup language document but, rather, identifies and retrieves from memory 502 low value blocks associated with original content requested by WD 100. In another embodiment where blocks are not stored in memory 500, processor 500 requests the original markup language document from web server 104, parses the markup language document as in block 706, and provides the requested original content block(s) to WD 100.

At block 720, the second markup language document is sent to WD 100 via network interface 504 and wide area network 106. In another embodiment, the low value block(s) associated with original content requested by WD 100 is sent to WD 100 via network interface 504 and wide area network 106. In yet another embodiment, both high value block(s) and the low value block(s) associated with original content requested by WD 100 is sent to WD 100.

At block 722, in one embodiment, some blocks stored in memory 502 at proxy server 102 may have their values changed by processor 500 if the content represented by a particular block has been requested more than a predetermined number of times, indicating content that is highly desired by users. Processor 500 may re-assign a higher value to any block having content that was requested a number of times greater than the predetermined threshold. For example, proxy server 102 may initially assign a low value to an advertisement. Subsequently, proxy server 102 receives more than 100 requests to provide the advertisement in original content requests, described above with respect to blocks 716-720. In response, processor 500 re-assigns a higher value to the low value block corresponding to the advertisement.

In another related embodiment, in a single web browsing session with WD 100, processor 500 re-assigns block values based on a number of times that a particular section of web sites are requested by a particular user or particular WD 100. For example, processor 500 may initially assign a low value to blocks representing the "comments" section commonly found on many web pages, and replace this content with replacement blocks for rendering by WD 100 into a modified web page lacking the comments. Subsequently, processor 500 can determine that WD 100 has requested the comments section of one or more web pages more than 20 times. Processor 500 can then re-assign a higher value to blocks related to "comments".

Figure 8:
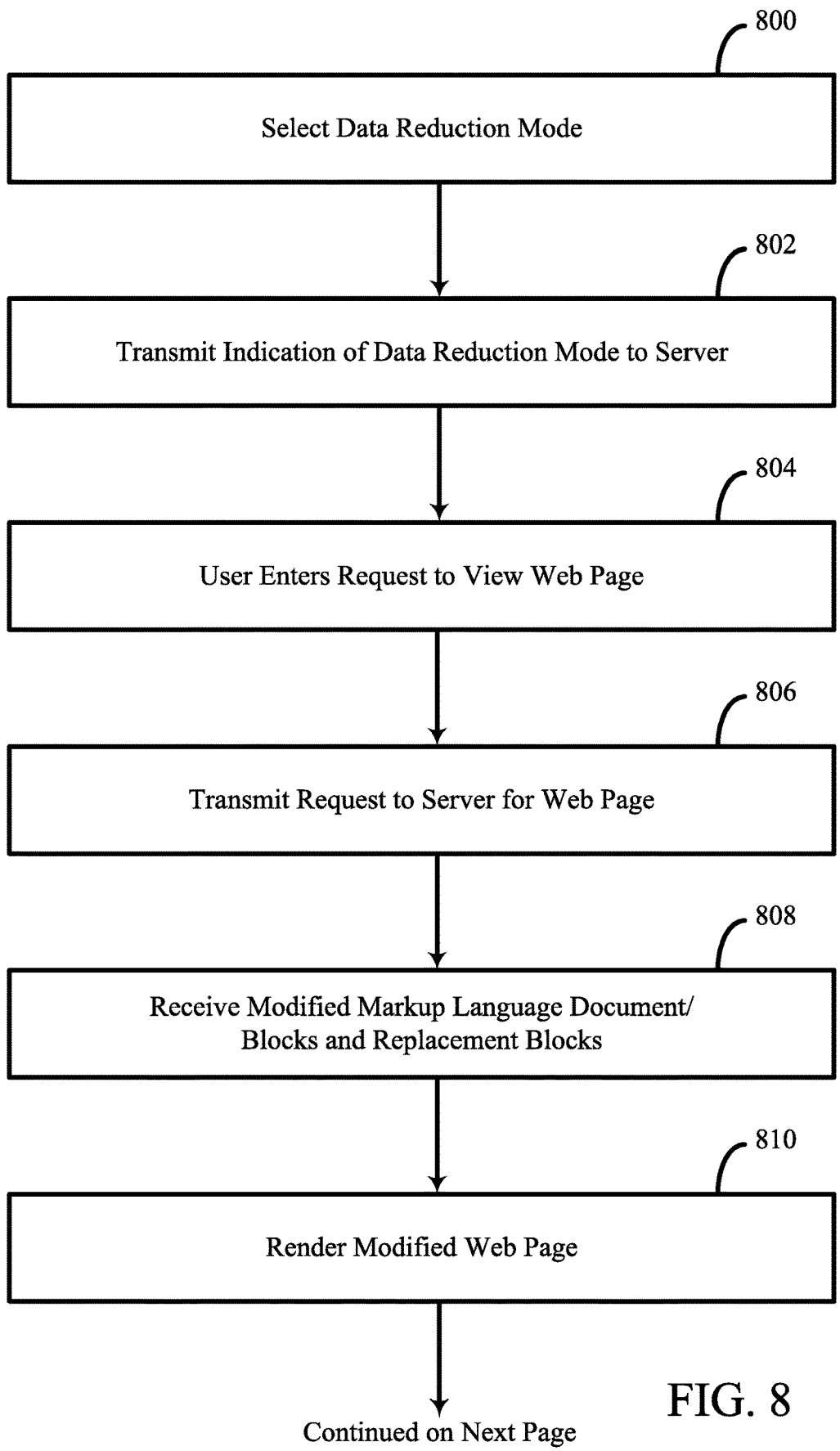
FIG. 8 is a flow diagram illustrating one embodiment of a method for rendering web pages, performed by the wireless device shown in FIG. 1.

FIG. 8 is a flow diagram illustrating one embodiment of a method for rendering web pages, as performed by WD 100, in order to reduce the amount of data transmitted over-the-air to WD 100. The method is implemented by processor 600 executing processor-executable instructions stored in memory 602. It should be understood that in some embodiments, not all of the steps shown in FIG. 8 are performed and/or that the order in which the steps are carried out may vary. Finally, some minor method steps have been omitted for purposes of clarity and simplicity.

At block 800, in one embodiment, a data reduction mode is chosen by a user of WD 100 via a browser operating on WD 100. In this embodiment, one of several data reduction modes are available when viewing web pages in the browser. In one embodiment, four data reduction modes are available: a Data Reduction Off mode, a Low Data Reduction mode, a High Data Reduction mode, and an Automatic Data Reduction mode. In other embodiments, a greater, or fewer, modes are available. For example, in one embodiment, only a Data Reduction Off mode and High Data Reduction mode is available. The mode may be pre-set in the operating system of WD 100 or as a user-changeable setting in a browser application running on WD 100. Additionally, or alternatively, a user may be prompted to select a data reduction mode by the operating system running on WD 100 or by the web browser. For example, the operating system or web browser may prompt a user to select a data reduction mode each time the user launches the web browser by providing a pop-up window that is displayed to the user with a menu of data reduction mode selections. The user may select one of the data reduction modes from the pop-up window. In another embodiment, the user is prompted to select a data reduction mode when WD 100 has consumed a predetermined amount of wireless data, for example, when WD 100 is nearing a predetermined periodic data consumption limit of the user's wireless data service contract.

In the Data Reduction Off mode, the web browser behaves in a typical manner, requesting web pages from web server 104, with no reduction in the amount of data transmitted over-the-air to WD 100. Original, complex web pages are, thus, rendered by the browser for display to a user.

In the Low Data Reduction mode, one or more techniques may be used to reduce some amount of data transmitted over-the-air to WD 100, but less than in the High Data Reduction mode. In one embodiment, as a result of being placed in the Low Data Reduction mode, subsequent HTTP requests are sent to proxy server 102, rather than to web server 104. In this embodiment, the Low Data Reduction technique is performed by proxy server 102, rather than web server 104. However, in other embodiments, the low data reduction technique could be performed by web server 104 and, therefore, HTTP requests continue to be sent to web server 104 while the browser is in the Low Data Reduction mode.

The High Data Reduction mode is described with respect to blocks 802 and on, below.

The Automatic Data Reduction mode is described with respect to the flow diagram of FIG. 9 later herein.

At block 802, an indication of the selected data reduction mode is transmitted to either proxy server 102 or web server 104, depending on which server is configured to use data reduction techniques. In response to receiving the indication, proxy server 102 or web server 104 enters a data reduction mode, as described above with respect to the method of FIG. 7.

At block 804, a user of WD 100 provides an indication, via user interface 604, to a web browser running on WD 100 of the user's desire to view a web page offered by web server 104. For example, a user may type in a domain name into the browser and press "Enter".

At block 806, processor 600 receives the indication from user interface 604, and transmits an HTTP request to proxy server 102, via transceiver 606 and wide area network 106, for proxy server 102 to provide the requested web page. In this embodiment, HTTP requests are transmitted to proxy server 102, rather than to web server 104, as a result of the browser being placed in the High Data Reduction mode, as proxy server 102 is configured to provide a reduction in the amount of data transmitted over-the-air to WD 100, while web server 104 is typically not configured to do so. In other embodiments, this data reduction technique could be performed by web server 104 rather than proxy server 102 and, therefore, HTTP requests are sent to web server 104, rather than to proxy server 102.

At block 808, a modified version of the web page is received by WD 100 from either proxy server 102 or web server 104 via wide area network 106 and transceiver 606 in the form of a modified markup language document, wherein at least some of the original content of the web page has been replaced by proxy server 102 or web server 104 with substituted content. The substituted content typically contains less information than the block that it replaces which results in a reduction in the amount of data transmitted over-the-air to WD 100. When rendered by a web browser on WD 100, the modified markup language document will appear to be missing sections of visual content relating to the low value blocks that were replaced during construction of the modified markup language document by proxy server 102 or web server 104. In one embodiment, a replacement block comprises markup language that, when rendered by a web browser, inserts a simple visual graphic, such as a blank space, into a section of the web page, replacing original content that was assigned a low value by proxy server 102 or web server 104. In another embodiment, the replacement block comprises markup language that, when rendered by a web browser, provides a blank space along with a text message indicating that some original content has been purposely replaced, and/or a hypertext message for the user to press in order to view the original content.

In another embodiment, rather than receive a modified markup language document at block 808, WD 100 receives one or more high value blocks and one or more replacement blocks from proxy server 102 or web server 104. The creation of replacement blocks and the selection of high value blocks and replacement blocks are explained above with respect to the method of FIG. 7.

At block 810, the modified markup language document is provided by processor 600 to the web browser running on WC 100, and the web browser renders the modified markup language document for presentation to the user via user interface 604. In another embodiment, processor 600 provides the high value blocks and the replacement blocks to the browser for rendering, forming the modified web page.

At block 812, a request is received by processor 600 from the user interface 604 indicating that the user wishes to view at least some of the original content that was replaced by substituted content in the modified web page. The request may identify a particular section of the modified web page to be updated with original content. The request may, alternatively, comprise a request to download the next-higher value block(s) of content, an indication to provide all of the low value blocks to WD 100, a request to provide all content shown in the display of WD 100, or some other request to provide additional content to WD 100.

At block 814, the request for original content is transmitted to proxy server 102 or web server 104 via transceiver 606 and wide area network 606.

At block 816, a second markup language document is received by WD 100 via transceiver 606 and provided to processor 600. In another embodiment, the low value block(s) associated with original content requested by WD 100 is received by WD 100 via transceiver 606 and provided to processor 600. In yet another embodiment, both high value block(s) and the low value block(s) associated with original content requested by WD 100 is received by WD 100.

At block 818, in one embodiment, processor 600, provides the second markup language document to the web browser for rendering into a second modified web page for display via interface 606. In another embodiment, processor 600 provides the high value block(s) and the low value block(s) received at block 816 to the web browser for rendering into the second modified web page. In another embodiment, the low value block(s) received at block 816 is/are rendered into the second modified web page without having to re-render the original content of the modified web page. The second modified web page now contains additional original content that had been replaced by substitute content in the modified web page. In one embodiment, a selected portion of the second modified web page now displays the original content. In another embodiment, other sections of original content are displayed, in addition to the section selected by the user at block 812. For example, an entire web page, or an entire first page of a web page, could be displayed.

Figure 9:
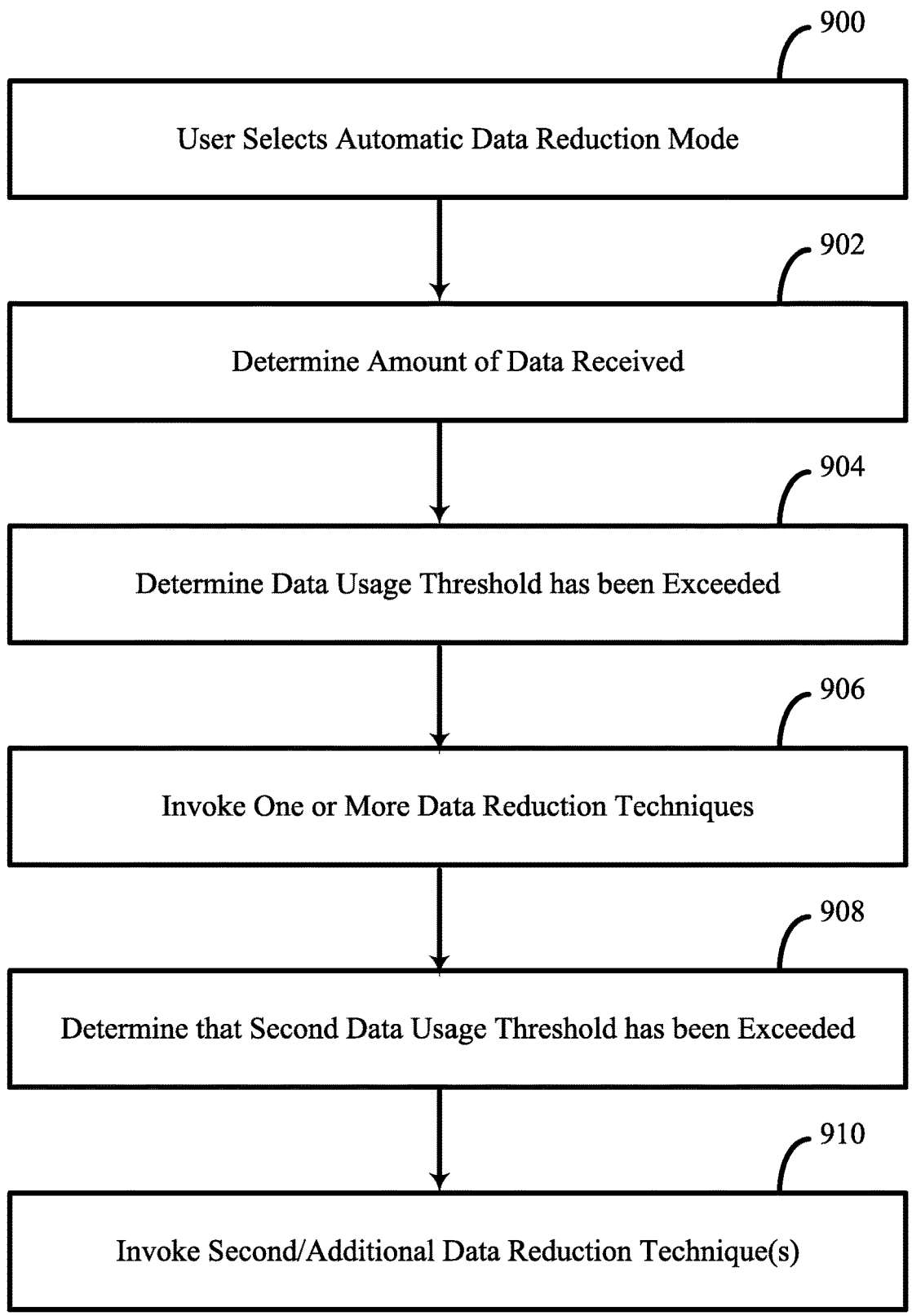
FIG. 9 is a flow diagram illustrating one embodiment of an automatic data reduction method for rendering web pages by the wireless device shown in FIG. 1.

FIG. 9 is a flow diagram illustrating one embodiment of execution of the Automatic Data Reduction mode, mentioned above with respect to the description of the method shown in FIG. 8. The method is implemented by processor 600 residing with WD 100, executing processor-executable instructions stored in memory 602. It should be understood that in some embodiments, not all of the steps shown in FIG. 9 are performed and/or that the order in which the steps are carried out may vary. Finally, some minor method steps have been omitted for purposes of clarity and simplicity.

At block 900, a user of WD 100 may select an Automatic Data Reduction mode for use in web browsing. In this mode of operation, processor 600 automatically determines whether to invoke any over-the-air data reducing techniques available to WD 100 based on one or more factors, as explained below. The user may select the Automatic Data Reduction mode as a result of being provided a menu of operating mode choices, for example each time a web browser is launched, upon processor 600 determining that a monthly data usage limit is being approached or exceeded, or available as a general setting for access at any time by the user of WD 100. In another embodiment, the Automatic Data Reduction mode could be a default setting for the web browser.

At block 902, processor 600 determines how much data WD 100 has received over a particular time period and how close the user is to exceeding a predetermined periodic data limit for the particular time period. For example, processor 600 may store a value in memory 602 indicative of the cumulative amount of data received since the start of a predetermined time period, for example, the start of a billing cycle. Processor 600 determines whether WD 100 has exceeded the periodic data consumption limit by comparing the value of the cumulative data received to either the periodic data consumption limit, or one or more predetermined data usage thresholds set to invoke data reduction techniques well before the periodic data consumption limit is reached. The predetermined data usage thresholds each may represent a predetermined percentage of the periodic data consumption limit, or comprise a fixed or variable number.

Processor 600 may determine whether any usage threshold has been reached upon the user launching the web browser on WD 100, on a continuous basis, or at periodic time intervals. In one embodiment, the one or more data consumption thresholds and the periodic data consumption limit may be set by the user via user interface 604, or it may be set by the wireless data service provider, or a combination of both. For example, the first data consumption threshold may be initially set by the service provider and then modifiable by a user. In any case, the one or more data consumption thresholds and periodic data consumption limit are stored in memory 602.

At block 904, processor 600 determines that WD 100 has exceeded a first data consumption threshold, or is approaching or has exceeded a periodic data consumption limit. For example, if the periodic data consumption limit is 1 G byte per month and the first data consumption threshold is 600 M bytes, processor 600 may determine that WD 100 has exceeded the first data consumption threshold.

In one embodiment, at block 906, upon exceeding the first data consumption threshold, processor 600 invokes one or more data reduction techniques by sending future HTTP requests to proxy server 102, rather than to web server 104. In another embodiment, processor 600 invokes one or more data reduction techniques by requesting a particular type of data reduction technique from either proxy server 102 or web server 104. For example, processor 600 could request that proxy server 102, or web server 104, begin using the image compression technique and/or the block replacement technique, both described above. In yet another embodiment, processor 600 alerts proxy server 102 or web server 104 to begin sending reduced-sized web pages in a manner determined by proxy server 102 or web server 104. For example, proxy server 102 or web server 104 could be configured to first reduce the size of web pages provided to WD 100 using the image compression technique, followed by the block replacement technique if a subsequent request to reduce over-the-air transmission is received from WD 100, as discussed below.

In one embodiment, more than one data consumption threshold is used to reduce the amount of data transmitted over-the-air to WD 100. Thus, at block 908, at some time after the determination at block 904, processor 600 determines that WD 100 has exceeded a second data consumption threshold. The second data consumption threshold may be set closer to the periodic data consumption limit than the first data consumption threshold. For example, if the periodic data consumption limit is 1 G byte, and the first data consumption threshold is 600 M bytes, then the second data consumption threshold set could be set something closer to 1 G byte, such as 800 M bytes.

As a result of determining that WD 100 has exceeded the second data consumption threshold, at block 910, processor 600 invokes one or more of the data-reducing techniques discussed above, either in addition or alternative, to a data-reduction technique already invoked as a result of exceeding the first data consumption threshold at block 904. For example, if proxy server 102 had already been using an image compression technique to transmit web pages to WD 100, processor 600 could send a message to instruct proxy server 102 instructing proxy server 102 to stop using the image compression technique and begin using the block replacement technique. In another embodiment, processor 600 sends a message to proxy server 102 to use the block replacement technique in addition to the image compression technique. Proxy server 102 responds to future HTTP requests from WD 100 in accordance with one or more data reduction techniques, until WD 100 provides an indication to proxy server 102 to either stop all data reduction techniques, or to use only one or more selected data conservation techniques.

The methods or algorithms described in connection with the embodiments disclosed herein may be embodied directly in hardware, in processor-executable instructions executed by a processor, or in a combination of the two. The processor-executable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or communication device. In the alternative, the processor and the storage medium may reside as discrete components.

Accordingly, various embodiments of the ideas presented herein may include a computer readable media embodying a code or processor-readable instructions to implement the methods of operation of the system in accordance with the methods, processes, algorithms, blocks and/or functions disclosed herein.

The subject matter described herein can be implemented as software, or processor-executable instructions, that is/are stored in one or more storage media. Such instructions, when executed by a computer, processor or other machine, may cause the computer, processor or other machine to perform one or more acts of a method. The instructions to perform the acts could be stored on one medium, or could be spread out across plural media, so that the instructions might appear collectively on the one or more computer-readable media, regardless of whether all of the instructions happen to be on the same medium. The term "computer-readable media" does not include signals per se; nor does it include information that exists solely as a propagating signal. It will be understood that, if the claims herein refer to media that carry information solely in the form of a propagating signal, and not in any type of durable storage, such claims will use the terms "transitory" or "ephemeral" (e.g., "transitory computer-readable media", or "ephemeral computer-readable media"). Unless a claim explicitly describes the media as "transitory" or "ephemeral," such claim shall not be understood to describe information that exists solely as a propagating signal or solely as a signal per se. Additionally, it is noted that "hardware media" or "tangible media" include devices such as RAMs, ROMs, flash memories, and disks that exist in physical, tangible form; such "hardware media" or "tangible media" are not signals per se. Moreover, "storage media" comprises media that store information. The term "storage" is used to denote the durable retention of data. For the purpose of the subject matter herein, information that exists only in the form of propagating signals is not considered to be "durably" retained. Therefore, "storage media" include disks, RAMs, ROMs, etc., but does not include information that exists only in the form of a propagating signal because such information is not "stored".

While the foregoing disclosure shows illustrative embodiments, it should be noted that various changes and modifications could be made herein without departing from the scope of the invention as defined by the appended claims. The functions, blocks and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:
1. A method comprising:
receiving a markup language document from a web server via a network interface, the markup language document corresponding to a web page;
parsing the markup language document into original blocks by a processor, each of the original blocks comprising code representing a respective portion of original content of the web page, each respective portion of the original content configured to be displayed;
ranking the original blocks by assigning respective values to the original blocks based on an amount of a type of information that is contained in each of the original blocks;
changing the value of a designated original block based on content represented by the designated original block being requested more than a predetermined number of times;
creating a plurality of replacement blocks by the processor, each replacement block of the plurality of replacement blocks corresponding to a respective one of the original blocks, the plurality of replacement blocks including less information than a plurality of respective original blocks to which the plurality of replacement blocks correspond, each of the plurality of replacement blocks comprising code representing substituted content of the web page, the substituted content configured to be displayed in lieu of the portion of the original content represented by the corresponding original block;
building a modified markup language document that includes some of the original blocks and one or more of the replacement blocks based at least in part on each original block that is included in the modified markup language document having a rank that is greater than a predetermined threshold and further based at least in part on each replacement block that is included in the modified markup language document corresponding to a respective original block having a rank that is less than or equal to the predetermined threshold; and
sending the modified markup language document in lieu of an entirety of the original content of the requested web page to a wireless device via the network interface for rendering by the wireless device.

2. The method of claim 1, further comprising:
assigning a first value to one or more of the original blocks, the first value indicative of a characteristic of the portion of the original content represented by a particular original block;
wherein building the modified markup language document comprises:
replacing at least one of the one or more original blocks assigned with the first value with a replacement block.

3. The method of claim 2, further comprising:
determining whether a specified original block comprises code representative of an advertisement;
wherein assigning the first value comprises:
assigning the first value to the specified original block based at least in part on a determination that the specified original block comprises code representative of an advertisement.

4. The method of claim 1, further comprising:
receiving a request from the wireless device to provide at least one portion of original content corresponding to at least one of the plurality of replacement blocks; and
sending at least one original block comprising the requested at least one portion of original content to the wireless device.

5. The method of claim 4, wherein the request to provide at least one portion of original content corresponding to at least one of the one or more replacement blocks comprises a request to provide all of the original content viewable in a display of the wireless device.

6. The method of claim 4, wherein the request to provide at least one portion of original content corresponding to at least one of the one or more replacement blocks comprises a request to provide all of the original content of the web page.

7. The method of claim 1, further comprising:
receiving an indication from the wireless device that the wireless device has exceeded a predetermined data usage threshold; and
increasing a number of replacement blocks provided to the wireless device in response to future web page requests by the wireless device, verses a number of replacement blocks provided to other wireless devices for the same future web page requests.

8. The method of claim 1, wherein ranking the original blocks comprises:
evaluating the original blocks using a text-recognition technique to determine the values of the respective original blocks.

9. The method of claim 1, wherein the one or more replacement blocks include a first replacement block and a second replacement block;
wherein the first replacement block comprises first code representing first substituted content of the web page that is selectable to cause the first replacement block to be replaced with a respective original block; and
wherein the second replacement block comprises second code representing second substituted content of the web page that is selectable to cause the second replacement block to be replaced with a respective original block.

10. The method of claim 1, wherein building the modified markup language document comprises:
selecting the one or more replacement blocks to be included in the modified markup language document based on keeping a total amount of data of the web page transmitted over-the-air less than a predetermined percentage of a size of the markup language document that is received from the web server via the network interface.

11. A system comprising:
memory; and
one or more processors coupled to the memory, the one or more processors configured to:
parse a markup language document that corresponds to a web page into original blocks, each of the original blocks comprising code representing a respective portion of original content of the web page, each respective portion of the original content configured to be displayed;
rank the original blocks by assigning respective values to the original blocks based on an amount of a type of information that is contained in each of the original blocks;
change the value of a designated original block based on content represented by the designated original block being requested more than a predetermined number of times;
create a plurality of replacement blocks, each replacement block of the plurality of replacement blocks corresponding to a respective one of the original blocks, the plurality of replacement blocks including less information than a plurality of respective original blocks to which the plurality of replacement blocks correspond, each of the plurality of replacement blocks comprising code representing substituted content of the web page, the substituted content configured to be displayed in lieu of the portion of the original content represented by the corresponding original block;
build a modified markup language document that includes some of the original blocks and one or more of the replacement blocks based at least in part on each original block that is included in the modified markup language document having a rank that is greater than a predetermined threshold and further based at least in part on each replacement block that is included in the modified markup language document corresponding to a respective original block having a rank that is less than or equal to the predetermined threshold; and
send the modified markup language document in lieu of an entirety of the original content of the requested web page to a wireless device for rendering by the wireless device.

12. The system of claim 11, wherein the one or more processors are configured to:
assign a first value to one or more of the original blocks, the first value indicating a characteristic of the portion of the original content represented by a particular original block; and
replace at least one of the one or more original blocks assigned with the first value with a replacement block.

13. The system of claim 12, wherein the one or more processors are configured to:
determine whether a designated original block comprises code representative of an advertisement; and
assign the first value to the designated original block based at least in part on a determination that the designated original block comprises code representative of an advertisement.

14. The system of claim 11, wherein the one or more processors are configured to, based at least in part on receipt of an indication from the wireless device that the wireless device has exceeded a predetermined data usage threshold, increase a number of replacement blocks provided to the wireless device in response to future web page requests by the wireless device, as compared to a number of replacement blocks provided to other wireless devices for the same future web page requests.

15. The system of claim 11, wherein the one or more processors are configured to:
evaluate the original blocks using a text-recognition technique to determine the values of the respective original blocks.

16. The system of claim 11, wherein the one or more processors are configured to:
select the one or more replacement blocks to be included in the modified markup language document based on keeping a total amount of data of the web page transmitted over-the-air less than a predetermined percentage of a size of the markup language document that is received from the web server via the network interface.

17. A system comprising:

memory; and one or more processors coupled to the memory, the one or more processors configured to:

parse a markup language document that corresponds to a web page into original blocks, each of the original blocks comprising code representing a respective portion of original content of the web page, each respective portion of the original content configured to be displayed;

rank the original blocks by assigning respective values to the original blocks based on an amount of a type of information that is contained in each of the original blocks, including evaluating the original blocks using a text-recognition technique to determine the values of the respective original blocks;

create a plurality of replacement blocks, each replacement block of the plurality of replacement blocks corresponding to a respective one of the original blocks, the plurality of replacement blocks including less information than a plurality of respective original blocks to which the plurality of replacement blocks correspond, each of the plurality of replacement blocks comprising code representing substituted content of the web page, the substituted content configured to be displayed in lieu of the portion of the original content represented by the corresponding original block;

build a modified markup language document that includes some of the original blocks and one or more of the replacement blocks based at least in part on each original block that is included in the modified markup language document having a rank that is greater than a predetermined threshold and further based at least in part on each replacement block that is included in the modified markup language document corresponding to a respective original block having a rank that is less than or equal to the predetermined threshold; and send the modified markup language document in lieu of an entirety of the original content of the requested web page to a wireless device for rendering by the wireless device.

18. The system of claim 17, wherein the one or more replacement blocks include a first replacement block and a second replacement block;

wherein the first replacement block comprises first code representing first substituted content of the web page that is selectable to cause the first replacement block to be replaced with a respective original block; and wherein the second replacement block comprises second code representing second substituted content of the web page that is selectable to cause the second replacement block to be replaced with a respective original block.

19. The system of claim 17, wherein the one or more processors are configured to, based at least in part on receipt of an indication from the wireless device that the wireless device has exceeded a predetermined data usage threshold, increase a number of replacement blocks provided to the wireless device in response to future web page requests by the wireless device, as compared to a number of replacement blocks provided to other wireless devices for the same future web page requests.

20. The system of claim 17, wherein the one or more processors are configured to:

select the one or more replacement blocks to be included in the modified markup language document based on keeping a total amount of data of the web page transmitted over-the-air less than a predetermined percentage of a size of the markup language document that is received from the web server via the network interface.

* * * * *